(12) United States Patent
Fritz et al.

(10) Patent No.: US 8,850,182 B1
(45) Date of Patent: Sep. 30, 2014

(54) DATA CAPTURE FOR SECURE PROTOCOLS

(71) Applicant: ShoreTel, Inc., Sunnnyvale, CA (US)

(72) Inventors: Kent Fritz, Mountain View, CA (US);
Jason Harper, Pleasanton, CA (US);
David Drell, Austin, TX (US); Prabjeet Singh, Sunnyvale, CA (US); Palani Selvam Thangavelu, Austin, TX (US)

(73) Assignee: Shoretel, Inc., Sunnyvale, CA (US)

( * ) Notice: Subject to any disclaimer, the term of this patent is extended or adjusted under 35 U.S.C. 154(b) by 84 days.

(21) Appl. No.: 13/630,758

(22) Filed: Sep. 28, 2012

(51) Int. Cl.
*H04L 29/06* (2006.01)

(52) U.S. Cl.
USPC ........................................................ 713/150

(58) Field of Classification Search
USPC ........................................................ 713/150
See application file for complete search history.

(56) References Cited

U.S. PATENT DOCUMENTS

| | | | |
|---|---|---|---|
| 5,944,843 A * | 8/1999 | Sharma et al. | 714/701 |
| 7,548,562 B2 | 6/2009 | Ward et al. | |
| 7,730,519 B2 | 6/2010 | Aaron et al. | |
| 7,761,705 B2 | 7/2010 | Aaron et al. | |
| 7,855,974 B2 | 12/2010 | Merkey et al. | |
| 7,984,175 B2 | 7/2011 | de la Iglesia et al. | |
| 8,233,843 B2 * | 7/2012 | Hashimoto et al. | 455/41.2 |
| 8,284,688 B2 | 10/2012 | Okada et al. | |
| 2004/0015992 A1 * | 1/2004 | Hasegawa et al. | 725/86 |
| 2006/0072464 A1 | 4/2006 | Aaron et al. | |
| 2011/0060907 A1 | 3/2011 | Hartmann et al. | |
| 2012/0057633 A1 * | 3/2012 | Shi et al. | 375/240.16 |
| 2012/0304224 A1 * | 11/2012 | Hines | 725/34 |
| 2012/0308005 A1 | 12/2012 | Garcia | |
| 2013/0212263 A1 * | 8/2013 | Breslin et al. | 709/224 |

FOREIGN PATENT DOCUMENTS

WO   WO 2008/030649 A2   3/2008

* cited by examiner

*Primary Examiner* — Dant Shaifer Harriman
(74) *Attorney, Agent, or Firm* — Tarolli, Sundheim, Covell & Tummino LLP

(57) ABSTRACT

This disclosure relates capture of encrypted network traffic. As an example, a non-transitory computer readable medium can include a command interface programmed to receive control instructions that control capture of protocol data from a network. A capture module can be programmed to receive decoded protocol data from a device application responsive to the control instructions and to synthesize frames of output capture data in that includes at least the decoded protocol data.

28 Claims, 3 Drawing Sheets

DATA CAPTURE FOR SECURE PROTOCOLS

TECHNICAL FIELD

This disclosure relates to data capture for secure protocols.

BACKGROUND

Packet capture tools can allow a user to capture packets that are being transmitted on a network. The extent of a given capture may be constrained by the configuration of the device on which the tool is installed and what packets the device can access. Packet capture tools can be used for network troubleshooting, analysis, as well as software and communications protocol development. For example, in many types of networks, the packet capture capability can be extremely valuable to support personnel and engineers to help isolate problems with external messaging, including signaling protocols and other forms of media. However, existing packet capture tools tend to be more restricted in situations where the messaging to be captured is encrypted since encrypted messaging would not be accessible to such tools. For example, if private keys are distributed along with the capture file, the security of the captured data could be compromised.

SUMMARY

This disclosure relates to capture of data that is sent using secure protocols (e.g., encrypted data sent via Ethernet frames).

In one example, a non-transitory computer readable medium can include a command interface programmed to receive control instructions that control capture of protocol data from a network. A capture module can be programmed to receive decrypted protocol data from a device application responsive to the control instructions and to synthesize frames of output capture data in that includes at least the decrypted protocol data.

In another example, a non-transitory computer readable medium having instructions that when executed by a processor perform a method that includes initiating a capture session at a remote device in response to command instructions received via a network. A decrypted protocol message can be received via an application program interface, the decrypted protocol message being generated by a device application of the remote device in response to the remote device receiving and decrypting an encrypted version of the decrypted protocol message. Frames of protocol data can be synthesized based on the decrypted protocol message and the synthesized frames of protocol data can be output to a destination.

In yet another example, a system can include a capture agent integrated into a device configured to communicate via a network. The capture agent can include a capture interface programmed to receive command instructions for controlling capture of data at the device. The capture agent can also include a capture module programmed to control capture of encrypted protocol data received by a device application via the network. The capture module can be programmed to receive decoded protocol data, corresponding to a decrypted version of the encrypted protocol data, via an application interface and to receive the encrypted protocol data based on the command instructions, the capture module programmed to synthesize frames of output capture data based on the decoded protocol data and the encrypted protocol data.

DETAILED DESCRIPTION

This disclosure relates to remote capture of protocol messages and other network traffic that may be encrypted. As an example, a command interface can be utilized to receive instructions that control a remote capture session. The instructions can program options for the capture, such as including setting filter parameters and other capture options. A capture module can be programmed to receive decoded protocol messages from a device application responsive to the control instructions. For example, the decoded protocol messages can be provided from protocol agents running in the device application, such as for communicating protocol messages and other forms of encrypted media. Similar mechanisms can be utilized to provide the capture module with system log information that may be relevant to other data being captured. The capture module further can synthesize frames of output capture data that includes at least the decoded message data.

The command interface further can communicate the synthesized output data via a secure transmission to a client analysis tool for viewing and analysis. Alternatively or additionally, the command interface can store the synthesized output data in memory for offline analysis and debugging. Since synthesized output data includes the decoded messages (e.g., in the readable format), there is no need to distribute private keys to decrypt the encrypted protocol message and/or other encrypted media. As a result, the viewing and analysis of captured data does not depend on the capabilities of the viewing/analysis tools.

Figure 1:
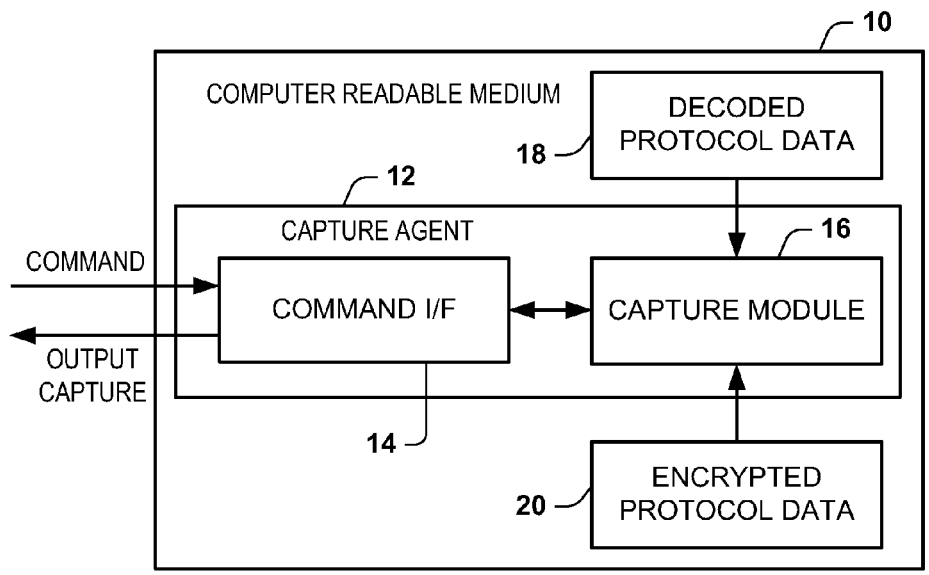
FIG. 1 illustrates an example of a computer-readable medium programmed to capture messages.

FIG. 1 depicts an example of computer readable medium 10 that can store machine readable instructions and data. The medium 10 can store instructions that include a capture agent 12 that can be integrated into or otherwise programmatically associated with an application to capture data, including from an encrypted protocol data stream. In the example of FIG. 1, the computer readable medium 10 can be non-transitory in nature. The medium 10 could be implemented, for example, as volatile memory (e.g., random access memory), nonvolatile memory (a hard disk drive, a solid state drive, flash memory or the like) or a combination thereof. The instructions in the medium 10 further can be accessed by one or more processing units to execute the machine-readable instructions stored therein for capturing protocol data as disclosed herein.

In the context of a telecommunications system, the protocol data, which can be encrypted, can be sent to or be transmitted by a device application. For example, the device application can be an authenticated instance of a telecommunications application running on a device, such as a wired telephone (e.g., a digital phone, a desktop IP phone or the like), a mobile phone, a videoconferencing terminal, a computer, a switch or the like. Such application further can be configured to decrypt encrypted protocol data as well as send encrypted messages.

By way of example, the encrypted protocol data can be implemented according to a signaling protocol, a real-time transport protocol (RTP), or other standard or proprietary communication protocol that may be communicated using transport layer security (TLS) or other form of encryption. As used herein, protocol data can include any type of data that is transmitted according to a predetermined protocol, which may be an open or commercially available protocol standard or a proprietary protocol for data communications over a network. Examples of signaling protocols that can be utilized include the Session Initiation Protocol (SIP), Media Gateway Control Protocol (MGCP), H.323 and Jingle to name a few. Such protocols further may be communicated as packets within Ethernet frames in a base transport layer, such as user datagram packets (UDP) or transport control packets (TCP). The capture agent 12 is not limited by what protocol(s) or type of encryption is utilized. The content of the encrypted messages that are sent from and received at the device application can vary according to application requirements. By way of example, a secure TLS message, such as may be transmitted via SIP, HTTP or other encrypted protocol, can contain a request (e.g. Java Script Object Notation (JSON) request) with the information that is being requested or a response to a request.

As a further example, the encryption can be implemented according to a cryptographic key-agreement protocol to negotiate the keys for encryption between two end points, such as between a server and a client (e.g., a phone application or a switch application instantiated within a telecommunication system). In some examples, the encryption can be implemented using secure RTP (SRTP), ZRTP, Secure Shell (SSH) or Pretty Good Privacy (PGP) to name a few.

The medium 10 includes a command interface 14 that is programmed to receive command control instructions for controlling capture of encrypted protocol data. The command instructions can be provided by a remote client, such as in response to a user input. Alternatively or additionally, the command instructions can be provided by another application. For example, the command instructions can include triggers that specify start and stop times for capture, specify one or more protocols for capture, set filter parameters for data capture and the like.

The command interface 14 can provide corresponding capture instructions to a capture module 16 based on the command that is received. The capture module 16 can be programmed to receive decoded protocol data 18 in response to the command control instructions received at the command interface 14. The decoded protocol data 18 can include a decrypted version of the payload from encrypted protocol data as well as selected header and transport information from the protocol data. The capture module 16 can receive the decoded protocol data 18 via a corresponding application interface, such as an inter-process communication (IPC) mechanism.

As an example, a device application can include one or more logical endpoints for the protocol data being communicated over a network. Each logical endpoint can be programmed to employ the IPC mechanism to send a copy of its decoded protocol data to the capture module 14. Each logical endpoint for protocol data can include one or more user agents that are authenticated in a network system and programmed to receive encrypted protocol data. There can be any number of such protocol user agents for a given device application. Each such protocol user agent can be programmed and authenticated to receive the encrypted protocol data and decrypt such data based upon a private key or other decryption mechanism that has been established between the user agent and a corresponding service or other agent with which it communicates via the protocol.

The capture module 16 can also receive the original version of the encrypted protocol data 20. The encrypted protocol data 20 can be captured as data frames from a network interface based on the command instructions provided to the command interface 14. For example, the capture module can invoke a capture interface to acquire the original capture of the encrypted protocol data via a network interface. For example, the command control instructions can include a trigger to control the start and stop of the capture session as well as include filters, such as can specify the source and destination IP-port pairs as well as the protocol or protocols that are to be captured.

The capture module 16 can further be programmed to synthesize frames of output capture data from the decoded protocol data 18. The capture module 16 can provide the synthesized frames and the encrypted protocol data frames to the command interface 14 to be provided as output capture data. The command interface 14 can distribute the output capture data a corresponding destination based on the command instructions that initiated the capture. For example, the command interface 14 can be programmed to send the output capture data to a remote capture tool. The transmission of the output capture data can be provided via a secured tunnel, such as via SSH tunneling. Additionally or alternatively, the command interface 14 can store the output capture data in memory, which may reside locally relative to the device at which the medium resides or remotely in a database or other storage device. In some examples, the output capture data can include the decoded capture data. In other examples, the output capture data may include both the synthesized frames of the decoded capture data and the original encrypted protocol data. Additionally or alternatively, in still other examples, the output capture data can include other information such as event log data, media streams and the like, which may be relevant to the captured protocol data for diagnosis and debugging purposes.

Figure 2:
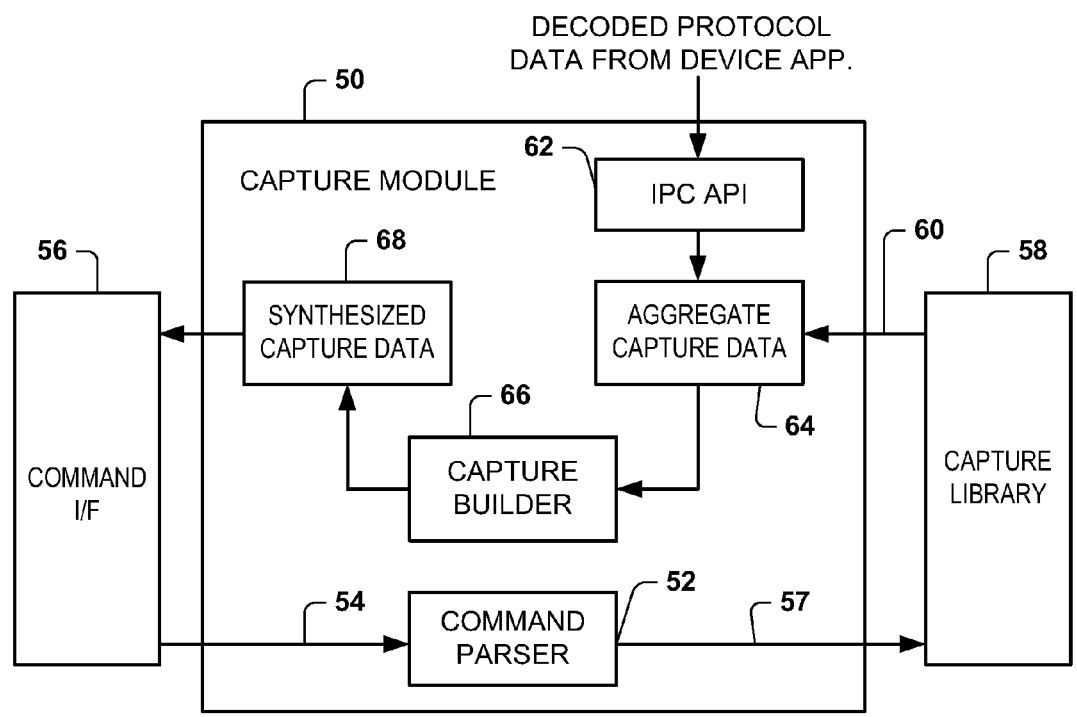
FIG. 2 illustrates an example of a capture module.

FIG. 2 depicts an example of a capture module 50. The capture module 50 can be implemented as part of the capture agent 12 in the computer readable medium 10 shown in FIG. 1. Thus, the capture module 50 can include computer executable instructions and data to receive and process capture data and to synthesize frames of output capture data as disclosed herein.

In the example of FIG. 2, the capture module 50 includes a command parser 52 that receives instructions 54 from a command interface 56. The command interface 56, for example can receive command instructions from a remote client to control capture of protocol data, including encrypted as well as non-encrypted protocol data. The command interface 56 provides capture options to the command parser to specify one or more filters and other options used to qualify selected packets to be captured. The command parser 52 can be programmed to convert the command instructions 54 to a predetermined format and send a request 57 that specifies capture options to a capture library 58. The command parser 52 can thus parse the command instructions for syntax and perform other functions related to initiating, stopping and controlling a capture session. For example, the command parser, can determine whether capture has already started, and based on this determination either initiate a session or ignore a capture accordingly.

As an example, the capture library 58 can provide an interface used by the command parser to set filter parameters for packet capture based on capture options that have been specified. For example, the filter parameters can include an expression that may include an identifier (ID) and one or more qualifiers. Examples of qualifiers can include type (e.g., host, network or port), transfer direction (e.g., to and/or from a given ID) and type of protocol (e.g., a particular protocol). The filter construct provided by the command parser 52 can also include an expression (e.g., Boolean logic, arithmetic or the like), which can also establish time constraints, such as start and stop times relative to timestamps. As an example, the capture library 58 can be implemented as TCPDUMP or LIBPCAP or Windows PCAP library available as open source software at www.tcpdump.org.

For example, the capture library 58 can employ DLLs to enable capture of the original packets from a network interface controller based on the capture options. For example, in response to capture options from the command interface 56, the capture library 58 can capture data from the network in a promiscuous mode, such that all traffic received at the device application via the network is provided to the capture module (e.g., within capture session). In other examples, the capture can be programmed to capture only the frames that the controller is intended to receive based on further parameters specified in the capture options provided as instructions via the command interface.

In response to the capture options provided by the command parser 52, the capture library 58 can be activated to capture the original data from the network via a network interface and provide the original captured data 60 to the capture module 50. The original captured data 60 can be encrypted frames of protocol data obtained from a network interface controller. In this way, the capture module 50 can access the capture library functions and methods for packet capture based on the options that have been specified by the command parser 52.

The capture module 50 can also be configured to receive protocol data from one or more protocol agents running in a device application. The protocol data can include decoded protocol data that has been decrypted by a respective protocol agent. The decoded protocol data can include the decrypted message as well as the source/destination IP-port pair, and a time stamp corresponding to when the protocol data was received or decoded at the device application. The protocol agent can provide the protocol to the capture module 50 via an IPC application interface 62. Each protocol agent can be programmed to utilize the same IPC API 62. In other examples, the device application in which each protocol agent is running can process the decoded protocol data and employ the IPC API 62 to send the decoded protocol data to the capture module 50. For example, the IPC API 62 can employ one or more methods (e.g., defining a socket, message queue or pipe to name a few) used by each protocol agent to send protocol data as specified by the API. The capture module can thus receive directly the protocol data that is sent via the IPC API 62.

Each of the original capture data 60 and the decoded protocol data can be aggregated by the capture module 50 as aggregate capture data 64, which can be stored in memory. The aggregate capture data 64 can be implemented as a hash table or other data structure that includes decoded protocol data as well as encrypted protocol data 60 that has been captured from the network according to the capture options.

As an example, the aggregate capture data 64 can be implemented as a hash table of data frames that is a hash mapping between the protocol messages and the source/destination IP-port pair of each of the decoded/encoded messages. For instance, each bucket in the corresponding table can include both the original capture frame and a list of the decoded protocol messages. As mentioned, the decoded protocol data from the device application can include the decrypted protocol message, a source/destination IP-Port pair for the message and a corresponding time stamp. The time stamp of the decoded protocol data, for example, may correspond to the time at which the device application received and decrypted the original encrypted data that was received via the network. Encoded and decoded data frames thus can be sorted within the table according to their respective time stamps.

The capture module 50 also includes a capture builder 66 that is configured to read from the aggregate capture data 64 and constructs synthesized capture data 68 in corresponding frames to be provided to a corresponding destination via the command interface 56. The capture builder 66 can read the data from the aggregate capture data 64 based on the timestamps for each frame.

By way of example, the capture builder 66 can generate Ethernet frames based on the aggregate capture data 64 to provide corresponding synthesized capture data 68. In some examples, the encrypted frames can remain unchanged from the captured frames. The capture builder 66 can utilize the same source/destination IP-Port pair to provide transport layer headers for the constructed synthesized frames. Such frames can include the same source/destination IP-Port pair as the base for the transport layer headers, the network layer (IP) headers and the link layer frame headers. The capture builder 66 is also configured to replace the transport layer source and destination port of the frames in the decoded protocol data with a port number that is a different port than in the original decoded message. The replacement of the source and destination port IP-pair can be done so that the capture tools will not interpret the decoded message as an encrypted message, which is expected to be in an unreadable format due to its encrypted format. Instead, by replacing the source and destination port in the synthesized frames of the decoded protocol data to a different port, which can be dynamically selected or be a predetermined port, capture tools can automatically render the decoded message data in a viewable format.

Additionally, the decoded message may not be a size (e.g., number of bits) capable of fitting into an Ethernet frame due to the decoded data possibly being larger than the original payload. Accordingly, the capture builder 66 can be programmed to repackage the decoded messages read from the aggregate capture data into corresponding standard frames. For instance, the repackaging of the decoded protocol data may require packaging a given decoded message into more than one synthesized frame. The resulting aggregate decoded protocol message may be represented as a single protocol message as a whole. Since the size of the messages and resulting frames being constructed can be different from the original decoded message, the capture builder 66 further can be programmed to recalculate TCP sequence numbers and length headers. The corresponding network layer (IP) check sums and transport layer (TCP/UDP) check sums further can be recalculated by the capture builder with the decoded message as its payload and inserted into the synthesized frame.

Once the capture builder 66 has synthesized frames from the decoded capture data (e.g., after recalculation and packaging into the corresponding frame), capture builder can move the resulting original capture with the encoded protocol message and the synthetic capture to the synthesized capture data 68. The respective frames can be stored in the synthesized capture data as a frame list that is sorted according to time stamps of each respective frame. The frame list in the synthesized capture data 68 can be stored in memory that is monitored and accessible by the command interface 56.

The frames in the synthesized capture data 68 can then be written back to the command interface 56 for distribution to a specified destination. For example, the command interface 56 can send the frames to a requesting entity, such as a capture tool, in the order according to the respective time stamps. The command interface 56 can send the frames via a secure transmission (e.g., SSH tunneling), for example. In view of the real-time decoding/decryption and IPC mechanism for providing the aggregate data capture, the resulting capture data can be output in substantially real-time. Alternatively or additionally, the synthesized capture data, including the decoded and the encoded messages, can be packaged in corresponding file and stored in memory for offline subsequent analysis.

Figure 3:
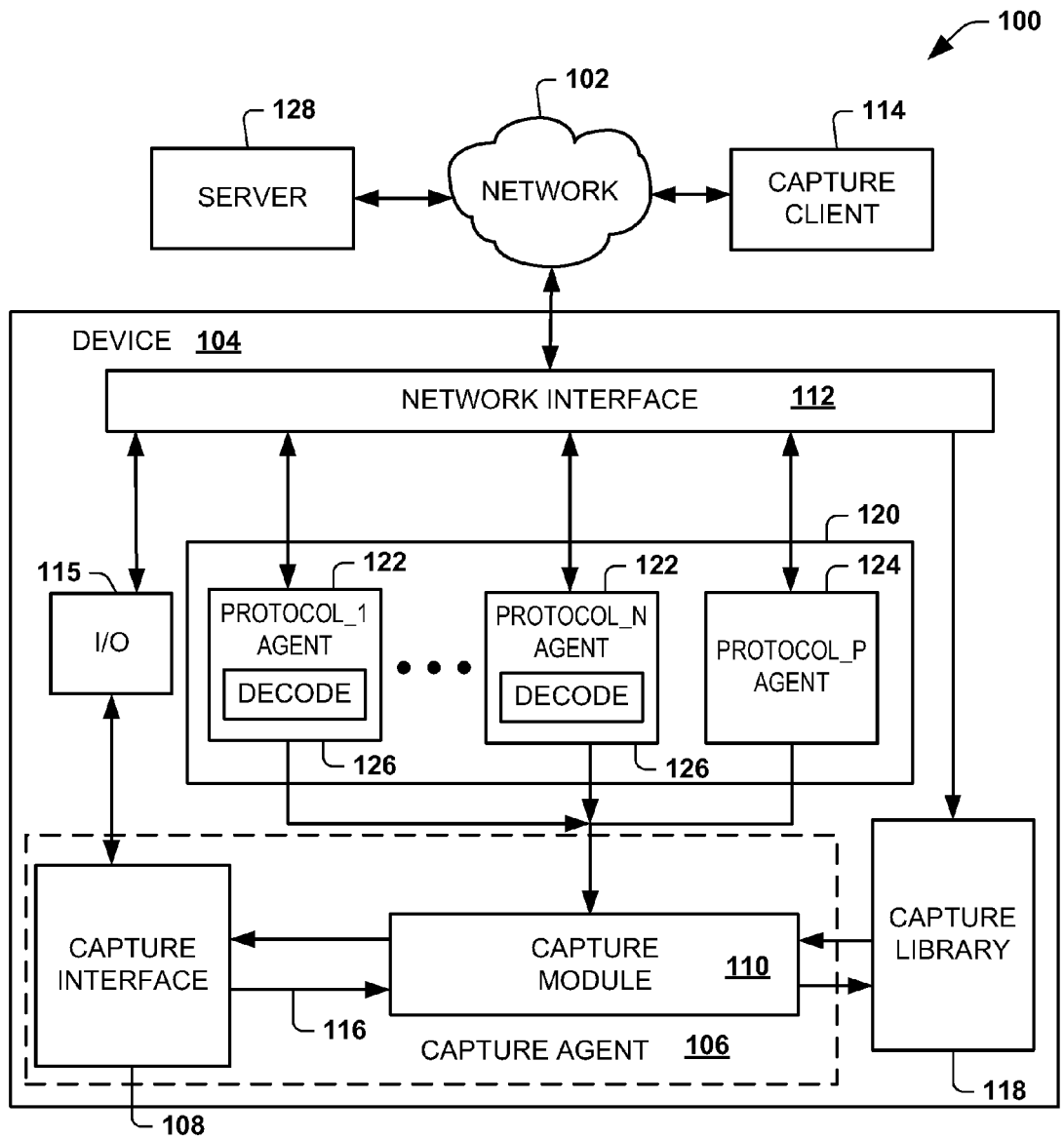
FIG. 3 illustrates an example of a system that can be implemented to capture protocol messages.

FIG. 3 is an example of a system 100 that can implement capture of an encrypted protocol data from a network 102. In the example of FIG. 3, the system 100 includes a device 104 that is connected to the network 102 for operation in the system. For example, the device can be implemented as a telephone, a switch, a server, a private branch exchange or other telecommunications device. The device 104 includes an integrated capture agent 106 corresponding to executable instructions (e.g., the capture agent 12 of FIG. 1) for implementing packet capture at the device as disclosed herein.

The capture agent 106 thus includes a capture interface 108 and a capture module 110. The capture interface (e.g., corresponding to a command line interface) 108 can communicate with a network interface 112 an input/output (I/O) redirection mechanism 113 that is coupled to the network 102. The capture interface 108 exposes functions and methods of the capture agent 106. Thus, the capture interface 108 can be invoked remotely to control the capture module 110 for capturing network data related to the device 104. For example, a capture client 114 can employ the capture interface 108 remotely to set capture options for one or more capture sessions, including capture of decrypted version of encrypted protocol data. The I/O redirection 113 can be an I/O of the operating system configured to redirect communications to and from the capture interface 108.

As mentioned above, the capture options can include triggers to start and stop capture, specify source/destination IP-Port pairs, specify the type of protocol as well as other filter parameters for controlling data capture. The capture interface 108 can provide corresponding capture options 116 to the capture module. The capture module 110 can parse the options for syntax and perform other capture management functions such as determining whether capture is already started or should be initiated. The capture module 110 can control capture of the original encrypted protocol data from the network interface 112 by accessing a capture library 118 that provides an interface for setting filter parameters for implementing packet capture based on the capture options 116. The capture library 118 thus can access original encrypted protocol data from the network interface 112 according to the capture command instructions.

A device application 120 running in the device 104 can include one or more protocol agents 122 and 124. For example, each protocol agent 122 and 124 can be implemented as a logical network endpoint that can receive and/or send messages according to a respective protocol. There can be any number of one or more such protocol agents 122 and 124 operating in the device application 120. For example, each of the protocol agents 122 and 124 can communicate protocol messages with one or more services running on a server 128. While a single server is shown for purposes of simplicity of explanation, any numbers of services and service can be distributed throughout the system 100.

In the example of FIG. 3, the protocol agents 122 are demonstrated Protocol_1 agent through Protocol_N agent, where N is a positive integer denoting the number of protocol agents 122 that are configured to send and receive encrypted protocol messages. Thus, each protocol agent 122 can include a decode function 126. Each decode function can correspond to private keys or other mechanism utilized for decrypting and encrypting protocol messages sent via the network interface 112 from the device application 120.

As one example, Protocol_1 agent can include a SIP user agent that sends and receives SIP messages in an encrypted manner according to the prescribed encryption and decryption mechanisms. Another of the N protocol agents 122 can be configured to send and receive encrypted RTP media streams via the network interface 112.

By way of further example, the encryption protocol for a given protocol agent 122 can be configured to perform Diffie-Hellman key exchange during a setup phase, such as in a Real-time Transport Protocol (RTP) media stream, which has been established the underlying signaling protocol. Once the keys have been established between the protocol agent 122 and the server or other endpoint, subsequent messages exchanged via the signaling protocol can be encrypted. The type of encryption that is utilized can be independent of the signaling layer.

Each of the encrypted messages that is sent to the protocol agents 122 via the network interface 112 can be provided to a specified source/destination IP-Port pair. Thus by identifying the source/destination IP-Port pair and protocol, which may be provided as part of the capture options 116 to the capture interface 108, the capture library 118 can capture the originally encrypted data and provide such data to the capture module 110. Such capture may be implemented in a promiscuous mode.

In the example of FIG. 3, the Protocol_P agent 124 can be configured to communicate using an unencrypted protocol. Thus, the protocol agent 124 can send and receive protocol messages via the network interface 112. As an example, the protocol agent 124 can be utilized to receive event log messages that may be communicated via the network interface in an unsecure manner. The system log events can be captured from the network interface and provided to the capture module 110 as part of the capture. The capture module can package the system log events as corresponding frames that can be synthesized as output capture data together with the decoded protocol data and original encrypted protocol data. For example, the agent can be programmed to further format or transcode the unencrypted captured data to a converted data form to facilitate subsequent analysis. In this way, the converted data that is sent from the device 104 to an analysis tool at the capture client 114 can be processed by the analysis tool without requiring distribution of decoder files or grammar files typically needed to enable the analysis tool to support customized or proprietary protocol messages for processing such captured data.

As disclosed herein, each of the protocol agents 122 and 124 may communicate the captured protocol messages and information to the capture module 110 using an IPC mechanism. For example, each of the protocol agents 122 and 124 can be configured to employ an API to provide the IPC messages to the capture module 110, which can be the same mechanisms but are shared among the respective protocol agents to facilitate exchange of information to the capture module. In other examples, each of the protocol agents 122 and 124 can provide IPC messages to the capture module 110 using its own socket or other separate IPC mechanism.

The capture module 110 can aggregate decoded protocol data, original encrypted protocol data and unencrypted protocol data that may be provided to the capture module. The capture module 110 can in turn synthesize the decoded protocol data into synthesized frames consistent with the decoded message (e.g., size, checksum, port, IP and the like). As disclosed herein, the synthesized frames and original encrypted frames can then be sent to the capture interface 108 for redistribution in the system 100. For example, the capture interface 108 can provide the synthesized frame, including the decoded and original encrypted protocol data, to the I/O redirection 113. The I/O redirection can thus redirect communications from the capture interface 108 to a specified capture client 114, such as may have initiated the capture session. The capture client 114, for example, may implement capture tools such as Wireshark or the like. In other examples, the capture interface 108 can store the capture data in a file such as may be stored in the network 102 or in memory at the server 128. For example, the server 128 can be an application server or a database configured to store capture data, such as for subsequent evaluation using analysis tools. The communication of the synthesized capture data by the capture interface 108 can be provided via secure tunneling (e.g., SSH).

Thus, it is to be appreciated that the capture agent 106 provides a mechanism that facilitates analysis of encrypted protocol data without requiring decryption at a capture and analysis tool that performs such analysis. For example, the encrypted protocol data can be decoded at the intended endpoint destination at the device and be aggregated by the integrated capture agent also resident in the device. The capture agent can then repackaged the decoded data and send it via secure tunneling from the device 104 to a desired destination, such as the capture client 114, server 128 or otherwise. While such ultimate secure tunneling can employ transport layer or other encryption approaches, there is no compromising the encryption methods utilized for the protocol data.

Figure 4:
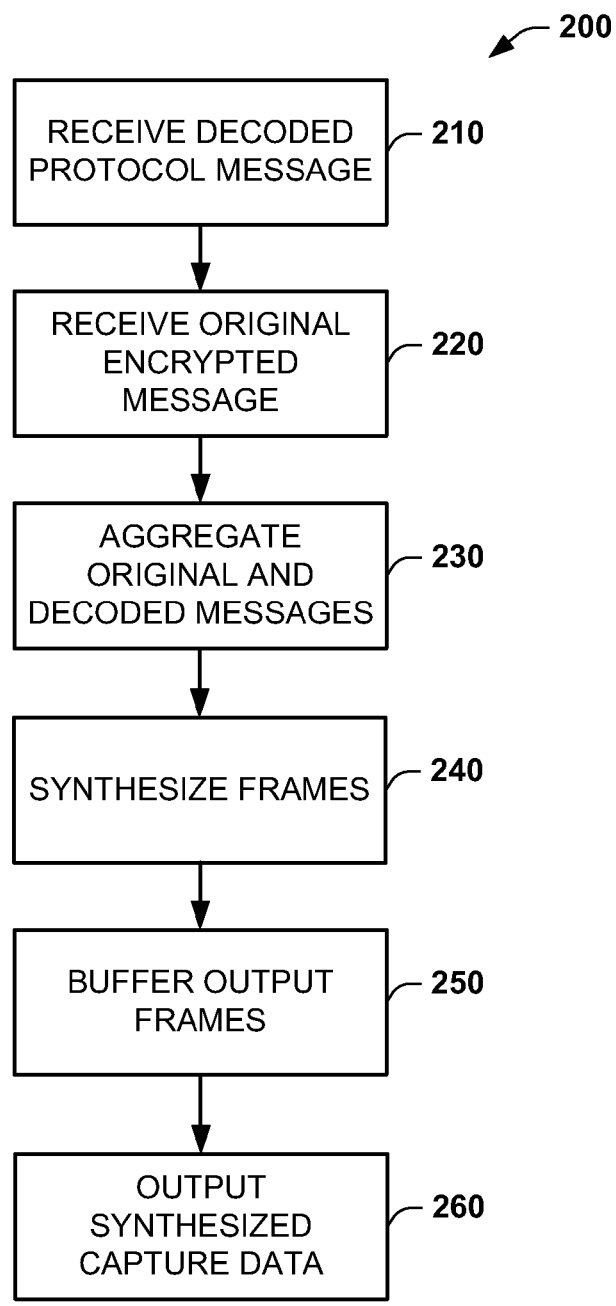
FIG. 4 illustrates a flow diagram of an example method that can be implemented to capture protocol messages.

In view of the foregoing examples, a method of implementing capture of encrypted protocol data will be appreciated with reference to FIG. 4. While, for purposes of simplicity of explanation, the example methods of FIG. 4 is shown and described as executing serially, the present examples are not limited by the illustrated order, as some actions could in other examples occur in different orders and/or concurrently from that shown and described herein. Moreover, it is not necessary that all disclosed actions be performed to implement a method. The method can be implemented as instructions that can be stored in memory and executed by one or more processors, such as residing in a device as disclosed herein.

FIG. 4 depicts an example of a method 200 that can be implemented for capturing encrypted protocol data. Parameters of a given capture can be based on command instructions received at a command interface (e.g., command interface 14 of FIG. 1). At 210, the method 200 includes receiving the decoded protocol message. For example, the protocol message can be decrypted by a protocol agent or other application residence on a device. The decrypted message can be communicated to the capture module (e.g., capture module 16 of FIG. 1) as decoded protocol data via an IPC mechanism. The decoded protocol data can include the decrypted message content as well as transport header information and a timestamp, as disclosed herein.

At 220, the original encrypted message is also received. For example, a capture library (e.g., capture library 58 of FIG. 2) can provide an interface to implement capture of data based on command instructions received via a command interface (e.g., command interface 14 of FIG. 1). The capture of the encrypted message thus can be stored as captured packets, which can include timestamps corresponding to when the packets are captured.

At 230, the original and decoded messages that are received can be aggregated (e.g., corresponding to aggregate capture data 64 of FIG. 2). For example, the decoded and original encrypted messages can be stored in a hash table as disclosed herein. Additional capture data (e.g., system event log data) can also be aggregated with the original encrypted and decoded capture data.

At 240, the decoded protocol data can be synthesized into corresponding frames (e.g., by capture builder 66 of FIG. 2). The synthesis of the frames at 240 can involve repackaging of the decoded message into corresponding Ethernet frames, which further can involve recalculating appropriate headers and check sums to facilitate proper decoding by the analysis tool for subsequent processing and presentation via a GUI. For example, the recalculation avoids the synthesized frame data from being interpreted as malformed Ethernet frames by the analysis tool. Additionally, since the original source/destination IP-Port pair can correspond to an encrypted port such port-pair can be replaced with a predetermined number to facilitate subsequent analysis by analysis tools.

At 250, the synthesized frames can be stored in a buffer (e.g., the synthesized capture data 68 of FIG. 2). The respective frames can be arranged in the buffer according to their time stamp to facilitate their output at 260. Thus at 260, the output capture data can be sent to a desired destination. For example, the frames can be transmitted (e.g., by command interface 56 of FIG. 2) as Ethernet frames to a packet capture tool. The transmission further may be implemented via secure tunneling, as disclosed herein. Alternatively or additionally, the output data can be stored as corresponding frames as a data file in a non-transitory computer readable medium, which may be local or remote (e.g., in a server).

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium having machine readable instructions comprising:
   a command interface programmed to receive control instructions that control capture of protocol data from a network; and
   a capture module programmed to:
      receive decrypted protocol data from a device application of a remote device responsive to the control instructions, wherein the remote device is configured to decrypt an encrypted version of the protocol data to generate the decrypted protocol data, wherein the encrypted version of the protocol data has been encrypted with a cryptographic key; and
      synthesize frames of output capture data that includes at least the decrypted protocol data, wherein the frames of output capture data have a different source and destination port than frames of the decrypted protocol data.

2. The medium of claim 1, wherein the capture module is configured to buffer the output capture data in an order for access by the command interface, the command interface being further programmed to send the output capture data to predetermined destination.

3. The medium of claim 2, wherein the destination comprises a capture client that provided the control instructions, the command interface sending the output capture data to the capture client via secure communications channel.

4. The medium of claim 2, wherein the destination comprises a storage medium, the output capture data being stored in the storage medium as a capture data file.

5. The medium of claim 2, wherein the output capture data is stored in an output frames list arranged in order of time stamps provided in each frame and the command interface sends out the output capture data to the destination according to the order.

6. The medium of claim 1, wherein the capture module further comprises a capture builder programmed to synthesize frames of the output capture data from the decoded protocol data, which includes a decrypted version of message content, associated housekeeping information and a timestamp.

7. The medium of claim 6, wherein the output capture data includes both an original capture of an encrypted version of the decrypted protocol data and the synthesized frames that include the decrypted protocol data.

8. The medium of claim 6, wherein the capture builder is programmed to recalculate header and error correction data for packets in the synthesized frames.

9. The medium of claim 6, wherein the capture builder is programmed to synthesize a protocol message from the decrypted protocol data that includes frames specifying a different port than identified in the decrypted protocol data that is received from the device application.

10. The medium of claim 6, wherein the capture module comprises a frames table to store aggregate capture data according to the control instructions, the aggregate capture data including the decrypted protocol data and a corresponding encrypted version of the protocol data captured from the network, the capture builder reading the decrypted protocol data and the corresponding encrypted version of the protocol data from the frames table to synthesize the output capture data as corresponding frames.

11. The medium of claim 1, wherein the control instructions further comprise capture options to qualify data for capture,
the capture module comprising a command parser to convert the capture options to a predetermined format and send the capture options to a capture library to qualify selected protocol data for capture from the network.

12. The medium of claim 1, wherein the capture module further comprises an inter-process communication interface, the device application employing the inter-process communication interface to send the decrypted protocol data to the capture module.

13. A non-transitory computer readable medium having instructions that when executed by a processor perform a method comprising:
initiating a capture session at a remote device in response to command instructions received via a network;
receiving a decrypted protocol message via an application program interface, the decrypted protocol message being generated by a device application of the remote device in response to the remote device receiving and decrypting an encrypted version of the decrypted protocol message, wherein the encrypted protocol data has been encrypted with a cryptographic key;
synthesizing frames of protocol data based on the decrypted protocol message; and
outputting the synthesized frames of protocol data to a destination.

14. The medium of claim 13, wherein the method further comprises aggregating the decrypted protocol message with the encrypted version of the decrypted protocol message that is concurrently captured at the remote device in response to the command instructions.

15. The medium of claim 14, further comprising buffering respective frames of the synthesized frames of protocol data and the encrypted version of the decrypted protocol message as output capture data arranged in an order based on time stamps of each frame, wherein the outputting further comprises outputting the output capture data the destination to the destination according to the order.

16. The medium of claim 14, wherein the decrypted protocol message comprises a decrypted version of protocol message content that is received in the encrypted version of the decrypted protocol message, associated housekeeping information and a timestamp.

17. The medium of claim 13, wherein the method further comprises recalculating at least one of header and error correction data for packets in the synthesized frames.

18. The medium of claim 13, wherein the method further comprises replacing a port identifier for the decrypted protocol message with a different port identifier than provided in the encrypted version of the decrypted protocol message received at the remote device.

19. A system to capture network data, comprising:
a capture agent integrated into a device configured to communicate via a network, the capture agent comprising:
a capture interface programmed to receive command instructions for controlling capture of data at the device; and
a capture module programmed to:
control capture of encrypted protocol data received by a device application via the network, the capture module programmed to receive decoded protocol data, corresponding to a decrypted version of the encrypted protocol data, wherein the encrypted protocol data has been encrypted with a cryptographic key, via an application interface; and
receive the encrypted protocol data based on the command instructions, the capture module programmed to synthesize frames of output capture data based on the decoded protocol data and the encrypted protocol data:
wherein the frames of output capture data have a different source and destination port than frames of the decrypted protocol data and the decoded protocol data is decrypted by a remote device.

20. The system of claim 19, wherein the capture module comprises a capture builder programmed to buffer the output capture data in an order for access by the capture interface, the capture interface being further programmed to send the output capture data to predetermined destination.

21. The system of claim 20, further comprising a capture client programmed to provide the command instructions to the capture interface via the network, the capture interface being programmed to send the output capture data to the capture client via secure communications.

22. The system of claim 21, wherein the capture module is programmed to store the output capture data in an output frames list arranged in order of time stamps in each frame, and
the capture interface being programmed to send the output capture data to the capture client according to the order the output capture data is arranged in the output frames list.

23. The system of claim 20, wherein the capture builder is programmed to recalculate the associated housekeeping information for the synthesized frames.

24. The system of claim 20, wherein the capture builder is programmed to construct the synthesized frames from the decoded protocol data as to include a different port than a port provided with the decoded protocol data.

25. The system of claim 20, wherein the capture module comprises a frames table to store aggregate capture data according to the command instructions, the aggregate capture data including the decoded protocol data and a corresponding encrypted version of the decoded protocol data captured from the network, frames of the aggregate capture data being arranged in the frames table based on an associated capture time stamp in each frame, the capture builder reading the decoded protocol data and the corresponding encrypted version of the decoded protocol data from the frames table to synthesize the output capture data organized as corresponding frames.

26. The system of claim 19, wherein the decoded protocol data includes a decrypted version of message content from the encrypted protocol data, associated housekeeping information and a timestamp.

27. The system of claim 19, wherein the application interface further comprises an inter-process communication application program interface, the device application employing the inter-process communication application program interface to deliver the decoded protocol data to the capture module.

28. The system of claim 19, wherein the capture module comprising a command parser to convert the command instructions to a request that to invoke a capture library to qualify selected protocol data and capture the encrypted protocol data from the network based on options specified in the request.

* * * * *